United States Patent [19]
Adams et al.

[11] 3,875,034
[45] Apr. 1, 1975

[54] METHOD AND APPARATUS FOR ODOR ABATEMENT

[75] Inventors: Leon M. Adams; Henry F. Hamil, both of San Antonio, Tex.

[73] Assignee: Corn Refiners Association, Inc., Washington, D.C.

[22] Filed: Dec. 11, 1972

[21] Appl. No.: 314,185

[52] U.S. Cl. ............... 204/165, 250/531, 423/245
[51] Int. Cl. ..................... B01d 53/00, B03c 9/02
[58] Field of Search ............ 204/165, 168; 423/245

[56] References Cited
UNITED STATES PATENTS

| | | | |
|---|---|---|---|
| 2,205,542 | 6/1940 | Ricard | 204/165 |
| 2,749,298 | 6/1956 | Thomas | 204/168 |
| 3,188,167 | 6/1965 | Specht | 423/212 |
| 3,274,090 | 9/1966 | Amborski | 204/165 |
| 3,291,712 | 12/1966 | McBride | 204/165 |
| 3,391,988 | 7/1968 | Friess | 423/245 X |
| 3,725,531 | 4/1973 | Pearson et al. | 423/244 |

*Primary Examiner*—F. C. Edmundson
*Attorney, Agent, or Firm*—George E. Kersey

[57] ABSTRACT

Method and apparatus for abating the odor of a gaseous stream containing one or more odorous organic contaminants. The gaseous stream is subjected to a silent electric discharge. This brings about at least the partial decomposition of the contaminants to an odor-abated form. The silent electric discharge is established in a reaction chamber to which the gaseous stream is applied.

10 Claims, 6 Drawing Figures

ILLUSTRATIVE CLASSES OF ODOROUS ORGANIC COMPOUNDS:

1. ORGANIC ACIDS
2. ALDEHYDES
3. MERCAPTANS
4. AMINES

ILLUSTRATIVE HYPOTHETICAL REACTION:

ORGANIC COMPOUND + $e^-$ ⟶
PRIMARY RADICAL ⟶ SECONDARY
RADICAL + $O_2$ ⟶ PEROXY RADICAL
⟶ ODOR-ABATED SUBSTANCE 3,875,034

METHOD AND APPARATUS FOR ODOR ABATEMENT

BACKGROUND OF THE INVENTION

This invention relates to the abatement of odors caused by organic compounds in gaseous streams and, more particularly, to the abatement of odors in gaseous exhausts emitted in the processing of organic substances.

Odorous organic compounds are often produced during, or as a consequence of, the processing of organic substances. Where liquids are present, or are employed during processing, the resulting products may be subjected to drying operations in order to drive off undesired fluid residues. This can result in gaseous exhausts that carry odorous organic compounds.

Thus in the wet milling process for the recovery of various products from corn, such as corn oil, gluten and starch, kernels of corn are initially steeped in water. Sulphur dioxide gas is added, and the kernels are subjected to a coarse grinding and pulping operation. This allows the "germ" of the kernels, from which corn oil is extracted, to be separated from the remainder of the pulped corn. The latter is then subjected to further stages of processing to recover such products as gluten and starch. Since each of the products has a residual wetness, it is generally subjected to a drying operation. This produces a gaseous exhaust which contains a variety of odorous organic contaminants. Typical contaminants associated with the wet milling process are organic acids, aldehydes, mercaptans and possibly amines.

In order to abate the odors caused by the organic contaminants in a gaseous stream, it has been common practice to use activated carbon, clay or molecular seives to absorb the odorous substances. This technique has the disadvantage that the absorptive materials become saturated in due course and require replacement. In addition, these materials present disposal problems of their own after they have become saturated with odorous contaminants.

Another technique for odor abatement in the case of organic contaminants has involved the "scrubbing" of the gaseous stream with water or some other suitable solvent. This technique also poses the problem of the need for replacing the solvent after it becomes laden with organic contaminants. There is also a disposal problem.

Another technique for dealing with odorous organic contaminants in gaseous streams has involved incineration. This technique has the disadvantage of requiring large quantities of fuel at the point of odor abatement.

Accordingly, it is an object of the invention to facilitate the abatement of odors in gaseous streams that carry odorous organic compounds. A related object is to abate odors associated with organic acid contaminants. Another related object is to abate odors respectively associated with aldehyde, mercaptan and amine contaminants.

Another object of the invention is to facilitate the abatement of odors in exhaust streams resulting from the processing of organic substances, particularly cereal grains such as corn.

A further object of the invention is to abate odors in gaseous streams without using absorbent or solvent materials. A related object is to avoid the need for activated carbon, clay or molecular seives in abating the odor of a gaseous stream. A further related object is to achieve odor abatement without the need for special solvents, including water.

Still another object of the invention is to achieve odor abatement without incineration of the odorous organic compounds in a gaseous stream.

SUMMARY OF THE INVENTION

In accomplishing the foregoing and related objects, the invention provides for subjecting a gaseous stream, containing at least one odorous organic compound, to a silent electric discharge to bring about at least the partial decomposition of the organic compound.

In accordance with one aspect of the invention, the gaseous stream may contain a number of odorous organic compounds which are obtained in large part from the processing of grain, particularly corn. Representative odorous compounds are organic acids, aldehydes, mercaptans and possibly amines.

In accordance with a further aspect of the invention, the gaseous stream contains oxygen which reacts with a decompostion product of the discharge. According to yet another aspect of the invention, liquid can be injected into the stream for humidity control, to reduce for example, the incidental production of ozone by the discharge. In accordance with a further aspect of the invention, the odorous organic compounds are injected into the gaseous stream as a liquid.

In accordance with still another aspect of the invention, the silent electric discharge is produced by electrodes in a reaction chamber to which the gaseous stream is applied. The silent discharge thus established is desirably of a brush type for which the discharge is adjusted to the threshold of arcing between the electrodes.

In accordance with a still further aspect of the invention, the residence time of the gaseous stream in the discharge is subject to control. In addition, means can be provided for injecting water vapor into the reaction chamber in order, for example, to control the humidity of the gaseous stream and regulate the extent of the incidental production of ozone. Means can also be provided for controlling the temperature at which the reaction chamber operates.

BRIEF DESCRIPTION OF THE DRAWINGS

Other aspects of the invention will become apparent after considering several illustrative embodiments, taken in conjunction with the drawings in which.

DETAILED DESCRIPTION

Figure 1:
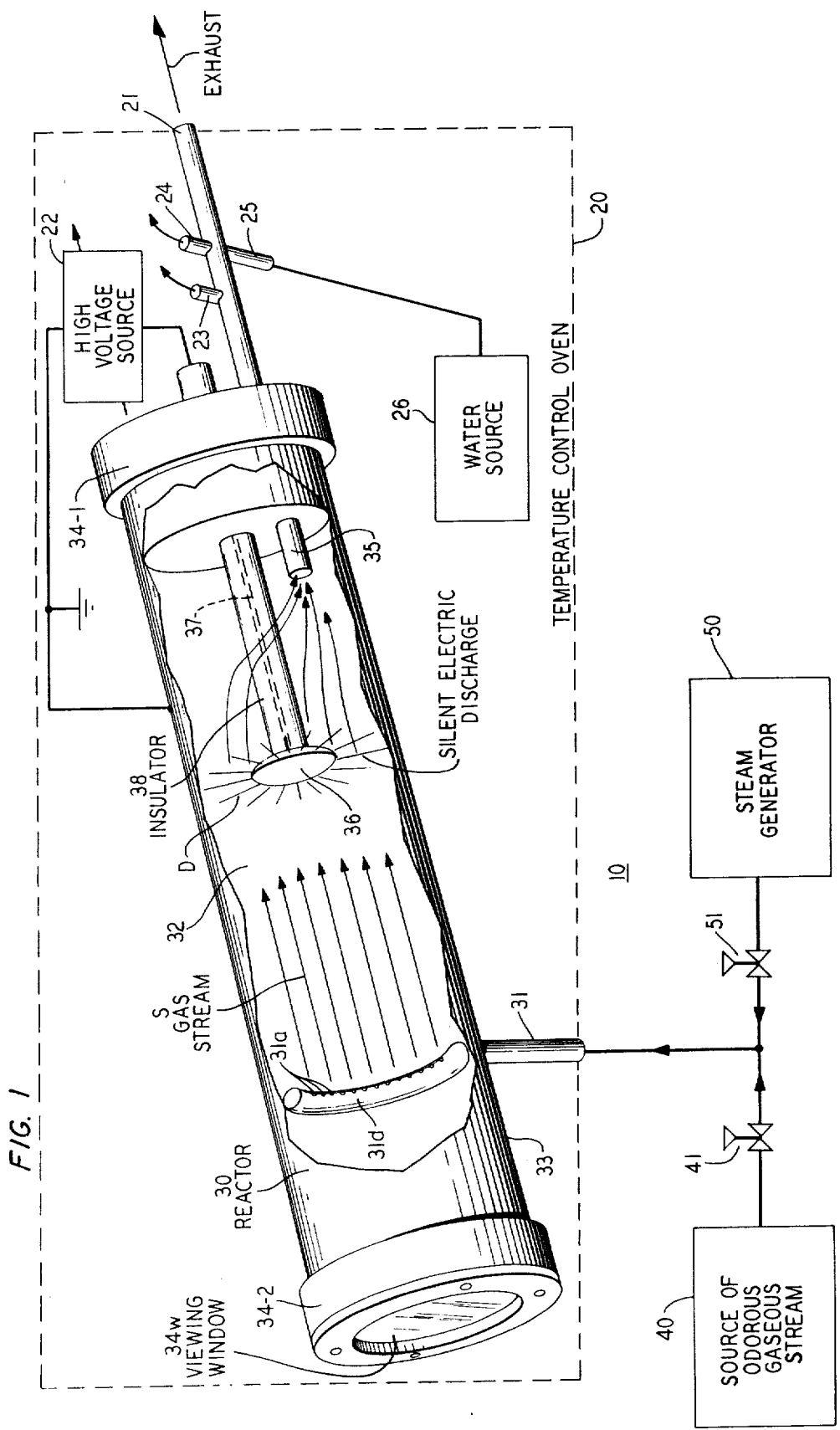
FIG. 1 is a diagram of an illustrative system for employing a silent electric discharge to abate odors in accordance with the invention.

Turning to the drawings, an illustrative system 10 for the abatement of odors in accordance with the invention is depicted in FIG. 1. The system 10 employs an illustrative reaction unit 20 containing a reactor 30 to which an odorous gaseous stream is applied from a source 40. The source 40 may be a gaseous exhaust at any of various stages in the processing of organic substances, including the various driers used in the recovery of products resulting from the wet milling process. Alternatively the source 40 may be a gaseous stream into which one of more liquid organic contaminants have been injected.

In the reactor 30, the gaseous stream is subjected to a silent electric discharge by which odorous organic compounds of the stream become at least partially decomposed, so that the residual gaseous stream discharged at a vent 21 of the reactor 30 is odor-abated. The term "silent electric discharge" is used in the sense of any electron discharge between two electrodes short of the point of arcing. In the case of the wet milling process, the gas is air and the odorous organic compounds are typically organic acids, aldehydes, mercaptans and possibly amines.

From the source 40, the odorous stream is applied through a control valve 41 to an inlet 31 of the reactor 30. After entering a chamber 32 of the reactor, the inlet 31 takes the form of a semi-cylindrical tube 31d with a set of apertures 31a. The latter promote the uniform flow of gaseous sub-streams S into the chamber 32 to the vicinity of an end cap 34-1 from the vicinity of an end cap 34-2.

The sub-streams S pass axially along the interior of the chamber and converge at an outlet tube 35. In so doing, they pass through a silent electric discharge D that is established between an interior electrode 36 and the shell 33. The discharge subjects the odorous organic compounds of the sub-stream to electron bombardment and brings about at least their partial decomposition. In the case of gaseous streams from a wet milling process, the odorous organic compounds become highly reactive free radicals or ions which decompose to odor-abated substances. As a result of the decomposition of the odorous organic contaminents, the gas stream that emerges from the vent 21 is considerably abated in odor. As shown in FIG. 1, the interior electrode 36 is in the form of a disk with a relatively sharp outer periphery to facilitate the formation of the silent electric discharge D. A conducting rod 37 extends into the chamber 32 and is affixed to the disk electrode 36 in order to energize it with respect to the shell 33. The conducting rod 37 is covered by an insulator 38 to confine the silent electric discharge D to a precisely defined region extending from the periphery of the disk electrode 36 to the outer shell 33. It is to be understood that the electrode structure is merely illustrative.

The electrodes 36 and 33 are energized from a variable, high voltage source 22, with the shell 33 taken as a point of reference or ground potential. The voltage from the source 22 may be positive or negative and be directly applied with respect to ground, or the voltage may alternate in polarity.

For the most effective operation of the reactor 30, i.e., the decomposition of the contaminants carried by the gaseous stream, the voltage of the source 22 is adjusted to a level where the discharge is just below the point of arcing between the electrodes 36 and 33. This provides the greatest density of electron discharge. With other conditions held constant this provides the greatest incidence of activation. During the adjustment of the voltage, it is initially increased from zero to a relatively low magnitude where a "dark corona" discharge is produced. This discharge is not visible to the eye, but its presence is confirmed by the flow of current in the high voltage source 22. As the voltage of the source 22 is increased further, a "glow corona" discharge appears. This discharge is in the visible range of the electromagnetic spectrum and is viewable through a window 34w in the end cap 34-2 at the inlet end of the reactor 30. A still further increase in the voltage of the source 22 results in a "brush discharge" for which "streamers" or "brushes" extend between the center electrode 36 and the shell 33. A further increase in voltage produces an arc discharge. The latter represents a breakdown over a localized path between the center electrode 36 and the shell 33. Such a breakdown is undesirable because it prevents the gaseous stream from being subjected to a uniform discharge. The brush discharge, on the other hand, is not only relatively uniform, it produces a relatively high density of discharge electrons for initiating the decomposition of odorous organic compounds.

The viewing window 34w in the inlet cap 34-2 permits visual monitoring of the adjustment of the variable voltage source 22 as the discharge passes from the "glow" to the "brush" condition. Because of the semicircular form of the inlet 31d within the chamber 32 there is an unobstructed view of the discharge D through the window 34w. However, the governing consideration with respect to the form of the inlet 31d is that the sub-streams of the odorous gas be suitably emitted into the chamber 32, and it will be understood that numerous other forms of inlet may be employed.

The end caps 34-1 and 34-2 of the chamber 32 are removable to permit access to the interior.

As noted above, the particular reactor 30 shown in FIG. 1 is merely illustrative. A suitable reactor for decomposing odorous organic compounds in a gaseous stream may take a wide variety of other forms and have other electrode structures, some of which are illustrated below.

In a test embodiment of the reactor 30, the end caps 34-1 and 34-2 were fabricated of a relatively non-odor releasing metal such as aluminum to prevent the reactor from itself augmenting the odor constituents in the gas stream. Alternatively, if the end caps 34-1 and 34-2 are of a porous, absorptive material, such as teflon, they can contribute to odor abatement by absorbing some of the contaminants in the gaseous stream.

Figures 2A, 2B, 2C:
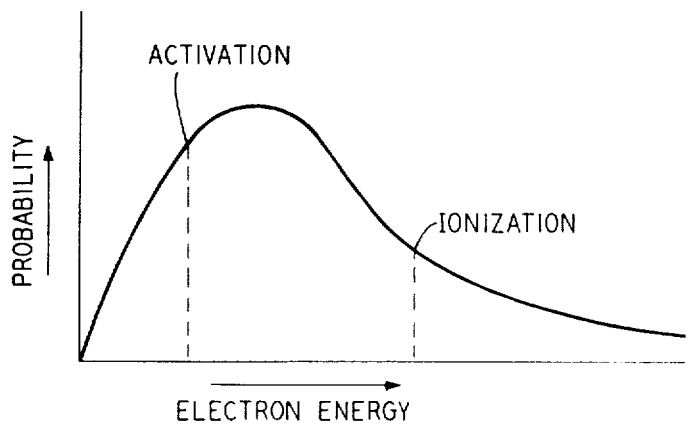
FIG. 2A is a listing of illustrative classes of odorous organic compounds found in gaseous streams for which odor is abated in accordance with the invention.
FIG. 2B is a statement of an illustrative hypothetical reaction providing odor abatement in accordance with the invention.
FIG. 2C is a graph showing electron energy distribution for a silent electric discharge used in accordance with the invention.

In the case of the wet milling process, the organic contaminants encountered in the gaseous exhaust from the various dryers are illustratively one or more of the classes of compounds set forth in FIG. 2A. The illustrative compounds are organic acids, aldehydes, mercaptans and possibly amines. Representative acids are butyric and n-caproic. Representative aldehydes include isobutyradehyde and furfural. Other representative aldehydes are pyruvaldehyde and methional, which is an aldehyde containing sulphur. A representative mercaptan is methyl mercaptan.

Returning to FIG. 1, the reactor 30 is shown placed within a temperature control oven represented by a dashed outline. While the decomposition of odorous organic compounds using a silent electric discharge in accordance with the invention may be practiced at ambient temperatures, there can be situations where the decomposition is enhanced by elevating the temperature of the gaseous stream. The temperature control oven serves that purpose. Further, a heater may be applied at the inlet 31 for additional temperature control. The temperature of the gaseous stream within the chamber 32 is indicated by a thermocouple serving as a dry-bulb thermometer in a housing on the vent 21.

Table I, below, shows the effect of temperature on the decomposition of isobutyraldehyde by silent electric discharge in a test reactor operated at about 20 kilovolts. As the reactor temperature increased, the percentage of decomposition of the contaminant also increased, as determined by gas chromatographic analysis.

TABLE I

| Dry-Bulb Temperature (°C) | Percentage Decomposition |
| --- | --- |
| 126° | 94% |
| 150 | 97–98 |

In addition to the gaseous stream from the source 40, the inlet 31 is able to receive an input from a steam generator 50, by the way of a valve 51. The steam generator 50 is used for controlling the humidity of the stream applied to the chamber 32 of the reactor 30. Where the gaseous stream is air, an increase in humidity reduces the incidental production of ozone, which is an acrid by-product of the discharge. The amount of vapor added to the gas stream from the generator 50 is controlled by a valve 51. An indication of the humidity of the gas stream is given by a thermocouple serving as a wet-bulb thermometer in a housing 24 of the vent tube 21. The wet-bulb thermometer is moistened in conventional fashion through housing 25 from a water source 26. The effect of humidity on the production of ozone is illustrated by Table II below. The test reactor again was operated at a voltage of approximately 20 kilovolts and the wet-bulb temperature readings gave indications ranging from approximately zero to 25 percent moisture. The corresponding reduction of the amount of ozone in the reactor output, taking the zero percent moisture concentration as unity, ranged downward to 1/20 for the 25 percent moisture condition.

TABLE II

| Wet-Bulb Temperature (°C) | Relative Concentration of Ozone |
| --- | --- |
| 35 | 1 |
| 45 | ½ |
| 75 | 1/20 |

Other factors that affect the extent of odor abatement and decomposition in accordance with the invention are: (1) the residence time of the gaseous stream in the discharge and (2) the power (wattage) of the discharge.

In general, as residence time increases, there is an increase in the extent of decomposition of the odorous organic substances in the gaseous stream. Illustrative test results for the relationship between residence time and decomposition of isobutyraldehyde are shown in Table III. For a residence time of 0.5 seconds the percentage decomposition was 78 percent. When the residence time was increased to 1 second, the percentage decomposition increased to approximately 97.5. Both reactions took place in a test chamber using a discharge voltage of approximately 19 kilovolts. it is to be noted that when the reaction chamber operated with a residence time of 0.5 seconds it was modified to accommodate a second electrode, the net effect was to double the overall residence time (because of the second electrode), with a result comparable to that obtained with a single electrode for a doubled residence time of a second.

TABLE III

| Residence Time (Seconds) | Percentage Decomposition |
| --- | --- |
| 0.5 | 78% |
| 1.0 | 79–98 |

Test results have further demonstrated that an increase in power in the electric discharge has a corresponding effect on the percentage of decomposition. As the voltage of the source 22 is increased, there is an increase in the density of the discharge and a corresponding increase in current flow. This results in increased discharge power and produces a corresponding increase in decomposition. As noted earlier, however, if the voltage is adjusted to the point of arcing, an irregular discharge pattern results in which some portions of the gaseous stream are not subjected to the electric discharge effect. Tables IVa and IVb below show the effect that an increase in electrical power has on the illustrative decomposition of furfural. Both tables show that as the test voltage was increased, producing a corresponding increase in current, there was an increase in the percentage of decomposition. Table IVa is for the case where the center electrode 36 has a positive potential with respect to the shell 33, while Table IVb is for a negative center electrode. Table IVa shows that a given percentage of decomposition was obtained with less power (voltage times current). This indicates greater efficiency per unit of power, but it is not possible to operate the reactor at as high a voltage and amperage as in the case of Table IVb. This is because there is a greater chance of arcing when the center electrode 36 is positive, since electrons are attracted to that electrode and become concentrated there, producing ions. On the other hand, where the central electrode 36 is negative, the electrons impinge upon the shell 33 in an area of reduced density, making it possible to operate at a higher voltage and current. It has been speculated that the greater efficiency of the reaction chamber with a positive central electrode 36 may be due to the fact that the ionization and ion concentration at the center electrode promote additional free radical effects.

TABLE IVa

| Voltage (Kilovolts) | Current (Microamperes) | Percentage Decomposition |
| --- | --- | --- |
| 10.0 | 50 | 55% |
| 14.8 | 100 | 79 |
| 16.2 | 200 | 87 |

TABLE IVb

| Voltage (Kilovolts) | Current (Microamperes) | Percentage Decomposition |
|---|---|---|
| 15.0 | 100 | 64 |
| 17.2 | 200 | 80 |
| 20.0 | 400 | 89 |

It is believed that there are a wide variety of reactions involved in the decomposition of odorous organic compounds to achieve odor abatement in accordance with the invention. Initially, the gaseous substances pass through the silent discharge and are bombarded by electrons which produce organic free radicals and ions. These radicals and ions are highly reactive and either undergo decomposition reactions or react with oxygen to form peroxy radicals, which in turn decompose to odor-abated substances.

An illustrative hypothetical reaction is summarized in FIG. 2B. The odorous organic compound carried by the gaseous stream, in being subjected to electron bombardment, becomes activated and forms a highly reactive primary radical. This radical decomposes spontaneously into a secondary radical (with a reduced amount of carbon in its structure) and in turn reacts with oxygen to form a peroxy radical. The latter decays to an odor-abated substance.

A representative aliphatic organic acid which is present as an odorous by-produce in the gaseous stream emitted from a corn dryer is butyric acid. In an illustrative intramolecular reaction, electron bombardment is believed to result in activation of the butyric acid molecule by breaking one of its bonds and forming a primary radical from which a hydrogen atom is separated. The primary radical is believed to spontaneously decompose to a secondary radical, giving off carbon dioxide. The secondary radical in turn is believed to react with oxygen in the air stream to form a peroxy radical that decomposes to acetone. In a test reactor operated with a negative center electrode at 19.5 kilovolts and 380 microamperes, with a dry-bulb temperature of 93°C and a residence time of 0.25 seconds, butyric acid was 55 percent decomposed. An increase in the decomposition would result from changes made in accordance with tables I through IVb above. For caproic acid with the test reactor operating under similar conditions, the percentage decomposition was 53 percent.

A similar reaction to that described above for organic acids can be applied to odorous aldehydes. It is believed that they become activated and form primary radicals which then become secondary propyl radicals. The latter are believed to react with oxygen to form isopropylperoxy radicals, and a further decay product is acetone. Depending on operating conditions, the decomposition of isobutyraldehyde in a test reactor ranged from 36 to about 98 percent. For furfural, the test decomposition ranged from 55 to 89 percent. When the test reactor was operated with a negative center electrode at 20.5 kilovolts and 600 microamperes, for a dry-bulb temperature of 121°C, the percentage decomposition of pyruvaldehyde was 66 percent. in the case of the sulfur aldehyde, methional, with the test reactor operating under conditions similar to those for pyruvaldehyde, the decomposition was 71 percent.

In the operation of a test reactor with methyl mercaptan, there was 100 percent decomposition using a negative center electrode at 15.5 kilovolts and a current of 225 microamperes, for a dry-bulb temperature of 116°C.

The foregoing reactions for butyric acid and isobutyraldehyde have been considered at the intramolecular level, but it is believed they may also take place at an inter-molecular level. Moreover, the electron bombardment may have the effect of only producing an excited state for the compound so that subsequently it is able to react with oxygen to produce a free radical that undergoes the type of decomposition reaction discussed above. Other decomposition reactions are possible as well.

It is to be noted that the mechanism of odor abatement involving the activation of odorous organic compounds in a gas is to be distinguished from mere ionization. As shown in FIG. 2C, there is a skewed distribution of electron energies in the silent electric discharge of FIG. 1. Ionization can take place only for electron energies beyond the knee of the curve, but the activation of odorous organic molecules can take place at energies below the knee of the curve. Any energy above the activation level shown in FIG. 2C will result in the activation of an organic compound and bring about the production of a free radical. Since there are many electrons with energies between the activation level and the ionization level, they all serve to promote the decomposition of the odorous organic substances.

Figure 3A:
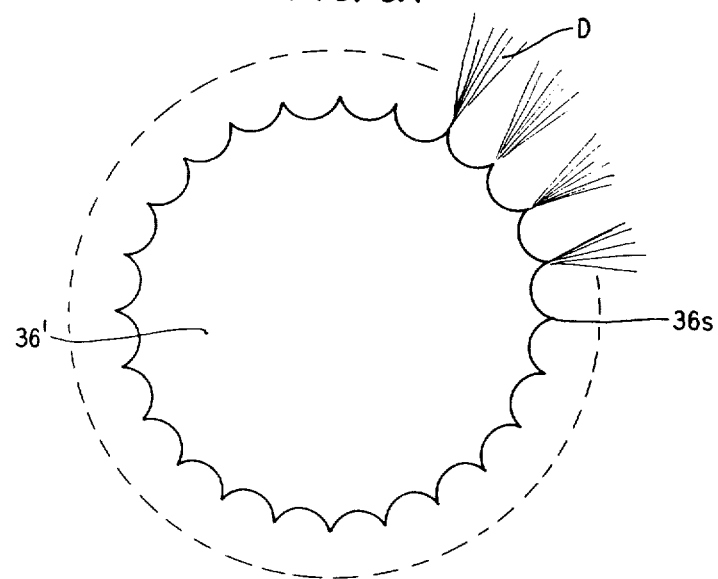
FIG. 3A is a diagram of an alternative central electrode for a reaction chamber employing a silent electric discharge for odor abatement in accordance with the invention.

As stated earlier, there are numerous types of electrode structure that may be adopted in realizing a suitable reactor for the decomposition of odorous organic compounds using a silent electric discharge. One such structure is illustrated by the alternative center electrode 36' of FIG. 3A. This electrode has a scalloped or serrated outer edge 36s which serves to inhibit the brush discharge D from spontaneously shifting about the electrode periphery. The resulting serration of the electrode produces a stabilizing effect on the discharge and promotes uniformity in the exposure of the gas stream to the discharge.

Figure 3B:
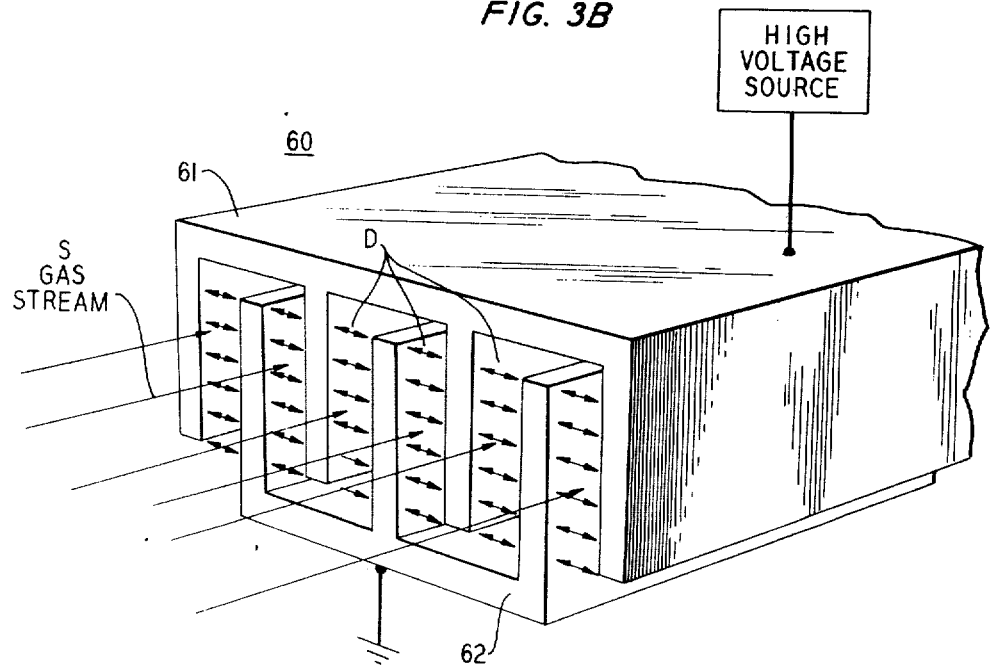
FIG. 3B is a perspective view of an overall, alternative electrode structure for practicing the invention.

An alternative form of electrode structure 60 is illustrated by FIG. 3B. In this embodiment, the electrode structure 60 is made up of alternate sets of plates 61 and 62 which are disposed in parallel with each other and are connected respectively to a high voltage source and to a reference potential. This arrangement provides a uniform discharge field, and the residence time of the gaseous stream S in the discharge D is controlled by the depth of the structure, as well as by the rate of gaseous stream flow. The structure 60 has the advantage that the control of residence time need not have an inhibiting effect on the rate of exhaust emission during a regular processing operation. In FIG. 3B the discharge field is shown with double-headed arrows to indicate that the voltage which establishes it, may be positive, negative or alternating. It will be understood that the multiple electrode effect achieved by the structure of FIG. 3B can also be achieved in a cylindrical reactor of the kind shown in FIG. 1 by the use of a set of discs, such as the electrode 36, at appropriate intervals along the length of the insulator 38.

While various aspects of the invention have been set forth by the specification and drawings, it is to be understood that the foregoing detailed description is for illustration only and that the various modifications, as

What is claimed is:

1. The method of abating the odor of a gaseous stream containing at least one odorous organic compound obtained in large part from the processing of grain, which comprises subjecting the stream to a silent electric discharge substantially at the threshold of arcing to bring about the partial decomposition of said organic compound.

2. The odor abatement method of claim 1 wherein said organic compound is an organic acid.

3. The odor abatement method of claim 1 wherein said organic compound is an aldehyde.

4. The odor abatement method of claim 1 wherein said organic compound is a mercaptan.

5. The odor abatement method of claim 1 wherein said organic compound is an amine.

6. The odor abatement method of claim 1 wherein said stream contains oxygen which reacts with a decomposition product from said discharge.

7. The odor abatement method of claim 1 wherein liquid is injected into said stream for controlling the humidity thereof.

8. The odor abatement method of claim 1 wherein said gaseous stream is subjected to said electric discharge at ambient temperature.

9. The odor abatement method of claim 1 wherein said gaseous stream is subjected to said electric discharge at a temperature above ambient level.

10. The method of abating the odor of a gaseous stream containing at least one odorous organic compound obtained in large part from the processing of grain, which comprises subjecting the stream to a silent electric discharge substantially at the threshold of arcing to bring about the partial decomposition of said organic compound, said organic compound being decomposible by electrons having energies below the ionization level therefrom.

* * * * *